United States Patent [19]

Eckert

[11] Patent Number: 4,547,853

[45] Date of Patent: Oct. 15, 1985

[54] ELECTRONIC POSTAGE METER RESET CIRCUIT

[75] Inventor: Alton B. Eckert, Norwalk, Conn.

[73] Assignee: Pitney Bowes Inc., Stamford, Conn.

[21] Appl. No.: 434,097

[22] Filed: Oct. 13, 1982

[51] Int. Cl.[4] .................................................. G06F 1/00

[52] U.S. Cl. .................................... 364/464; 364/466; 364/900

[58] Field of Search ... 364/464, 466, 468, 900 MS File; 101/91

[56] References Cited

U.S. PATENT DOCUMENTS

| | | | |
|---|---|---|---|
| 4,131,942 | 12/1978 | Gillett et al. | 364/200 |
| 4,285,050 | 8/1981 | Muller | 364/900 |
| 4,301,507 | 11/1981 | Soderberg et al. | 364/900 |
| 4,302,821 | 11/1981 | Eckert et al. | 364/464 |

*Primary Examiner*—Errol A. Krass

*Assistant Examiner*—Heather R. Herndon

*Attorney, Agent, or Firm*—David E. Pitchenik; William D. Soltow, Jr.; Albert W. Schribner

[57] ABSTRACT

A reset circuit for an electronic postage meter controls the operation of the reset line of the meter's computing system. The reset circuit operates in conjunction with a non-volatile memory protection circuit. The inter-relation of the reset circuit and non-volatile memory protection circuit protects against the possible loss of postage funds due to spurious data being written into the non-volatile memory. The reset circuit operation is controlled in part by the voltage levels applied to the non-volatile memory. This insures that the reset to the electronic postage meter computing system is released during power-up of the meter after proper voltage levels have applied to the user's non-volatile memory and reestablished during low power or power-down conditions.

9 Claims, 3 Drawing Figures

ELECTRONIC POSTAGE METER RESET CIRCUIT

FIELD OF THE INVENTION

The present invention relates to electronic postage meters, and more particularly, to an electronic postage meter reset circuit for microprocessor-based electronic postage meter systems.

BACKGROUND OF THE INVENTION

Electronic postage meter systems have been developed, as for example, the systems disclosed in U.S. Pat. No. 3,978,457 for MICROCOMPUTERIZED ELECTRONIC POSTAGE METER SYSTEM, and in European Patent Application, Application No. 80400603.9, filed May 5, 1980 for ELECTRONIC POSTAGE METER HAVING IMPROVED SECURITY AND FAULT TOLERANCE FEATURES. Electronic postage meters have also been developed employing plural computing systems. Such a system is shown in U.S. Pat. No. 4,301,507 for ELECTRONIC POSTAGE METER HAVING PLURAL COMPUTING SYSTEMS.

The accounting circuits of electronic postage meters include non-volatile memory capability to store postage accounting information. This information may include the amount of postage remaining in the meter for subsequent printing or the total amount of postage printed by the meter. Other types of accounting or operating data may also be stored in the non-volatile memory. The non-volatile memory function in the electronic accounting circuits have replaced the function served in previous mechanical type postage meters by mechanical accounting registers. Postage meters with mechanical accounting registers are not subject to many problems encountered by electronic postage meters. Conditions cannot normally occur in mechanical type postage meters that prevent the accounting for a printing cycle or which result in the loss of data stored in the registers.

Conditions can occur in electronic postage meters where information stored in electronic accounting circuits can be permanently lost. Conditions such as a total power failure or fluctuation in voltage can cause the microprocessor associated with the meter to operate erratically and either cause a loss of data or the storage of spurious data in the non-volatile memory. The loss of data or the storage of spurious data may result in the loss of information representing the postage funds stored in the meter. Since data of this type changes with the printing of postage and is not stored elsewhere outside of the meter, there is no way to recover or reconstruct the lost information. In such a situation, a user may suffer a loss of postage funds.

To minimize the likelihood of a loss of information stored in the electronic accounting circuits, efforts have been expended to insure the high reliability of electronic postage meters. Some systems for protecting the critical information stored in meters are disclosed in the above-noted patents as well as in U.S. Pat. No. 4,285,050 for ELECTRONIC POSTAGE METER OPERATING VOLTAGE VARIATION SENSING SYSTEM and in U.S. patent application Ser. No. 306,979 filed Oct. 5, 1981, for MEMORY PROTECTION CIRCUIT FOR AN ELECTRONIC POSTAGE METER, and assigned to Pitney Bowes Inc. These systems provide protection against unpredictable circuit operation even if the microprocessor manfunctions at low voltage levels, as for example, where the microprocessor turns off below a predetermined voltage level and thereafter, within a lower voltage range, turns on again and becomes capable of outputting data.

SUMMARY OF THE INVENTION

The present invention provides a reset circuit which helps insure proper operation of an electronic postage meter. The reset circuit operates in conjunction with a non-volatile memory protection circuit. The combined operation of the reset circuit of the present invention and the non-volatile memory protection circuit controls the reset line of the electronic postage meter computing means and the write enable terminal of the non-volatile memory. The reset circuit and the non-volatile memory protection circuit operate to insure proper function of the electronic postage meter during power-up and power-down of the meter as when the meter power switch is turned on and off. The circuits further protect the electronic postage meter from improper operation where spurious data might be written into the non-volatile memory.

The present invention enables the reset circuit to operate in conjunction with voltages applied to the non-volatile memory to insure that the microprocessor reset is not released enabling the microprocessor to commence operation, until after the non-volatile memory voltage is at its proper level. The reset circuit operates in a manner which insures that the reset terminal is maintained active to hold the microprocessor in the reset state while the voltage levels build so that the microprocessor will be enabled to write data into the meter's non-volatile memory only after the memory is properly powered. The reset circuit of the present invention may also operate to simultaneously apply an active reset signal to the microprocessor when the necessary voltages to write into the non-volatile memory falls below a predetermined level.

When a power reduction occurs causing the electronic postage meter to go into a power down routine, the reset circuit will cause the reset to go active putting the microprocessor into a known state after the completion of the power down routine when the non-volatile memory write voltage falls below a predetermined level. During a power-up condition, the reset circuit of the present invention causes the reset terminal to be active until after the voltages have stabilized on the electronic postage meter non-volatile memory. The reset circuit of the present invention may be adapted to simultaneously control plural reset terminals of plural computing systems. For example, the reset terminal of both an accounting module microprocessor and another microprocessor in the system, such as the microprocessor associated with the printing module, may be simultaneously controlled by the reset circuit of the present invention.

In accordance with the present invention, a reset circuit is provided for an electronic postage meter of the type having printing means for printing postage, accounting means coupled to said printing means for accounting for postage printed by the printing means and non-volatile memory means coupled to the accounting means for storing data when the accounting means is not energized by a source of operating power. The reset circuit includes controlling means coupled to the non-volatile memory means and the accounting means. The controlling means controls the sequence of enabling the non-volatile memory means to operate and the enabling the accounting means to be conditioned to write data into the non-volatile memory. The controlling means is operable to enable the non-volatile memory to have data written into memory locations and thereafter enabling the accounting means to write data into the non-volatile memory.

DETAILED DESCRIPTION OF THE DRAWINGS

Figures 1, 1B:
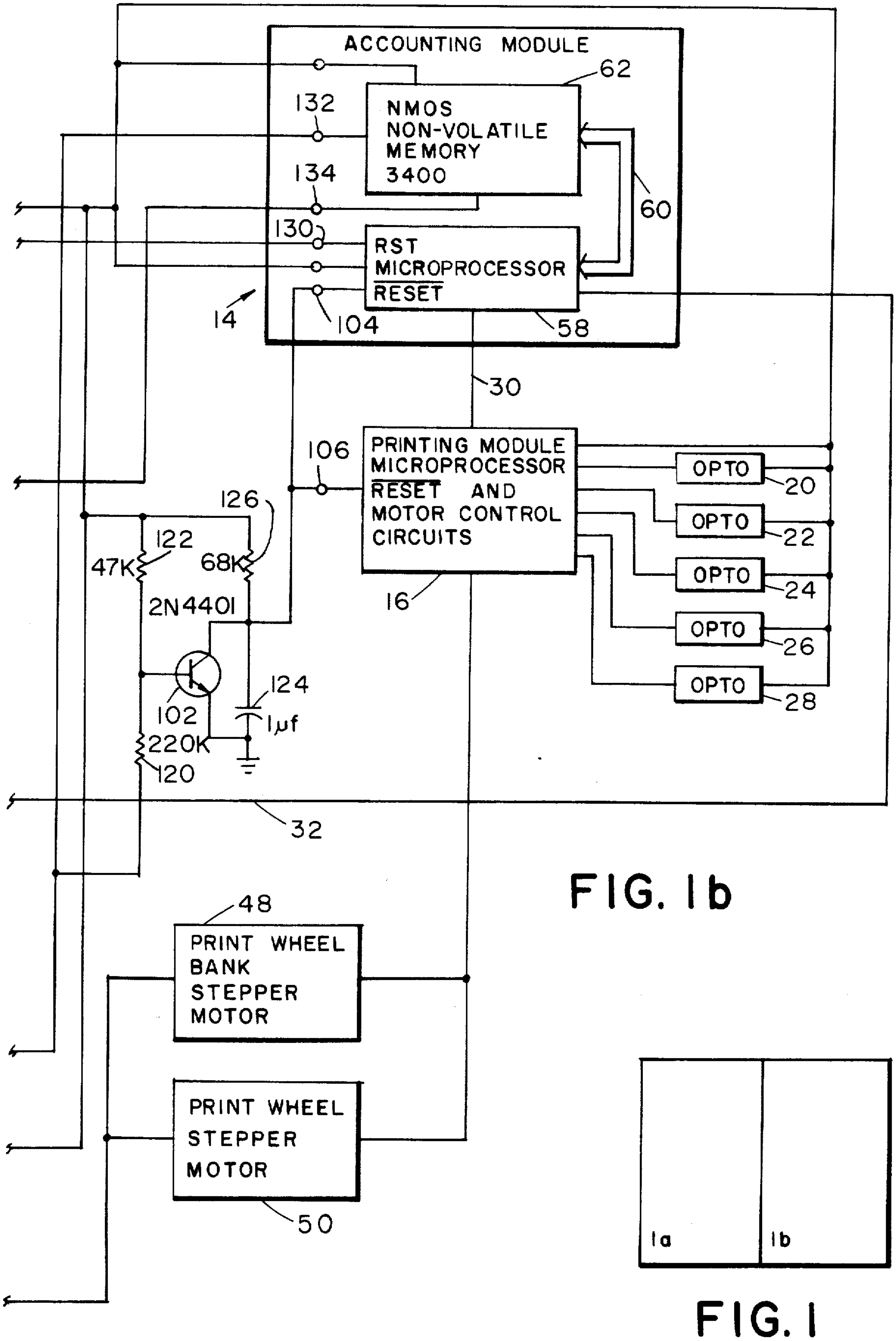
Figure 1A:
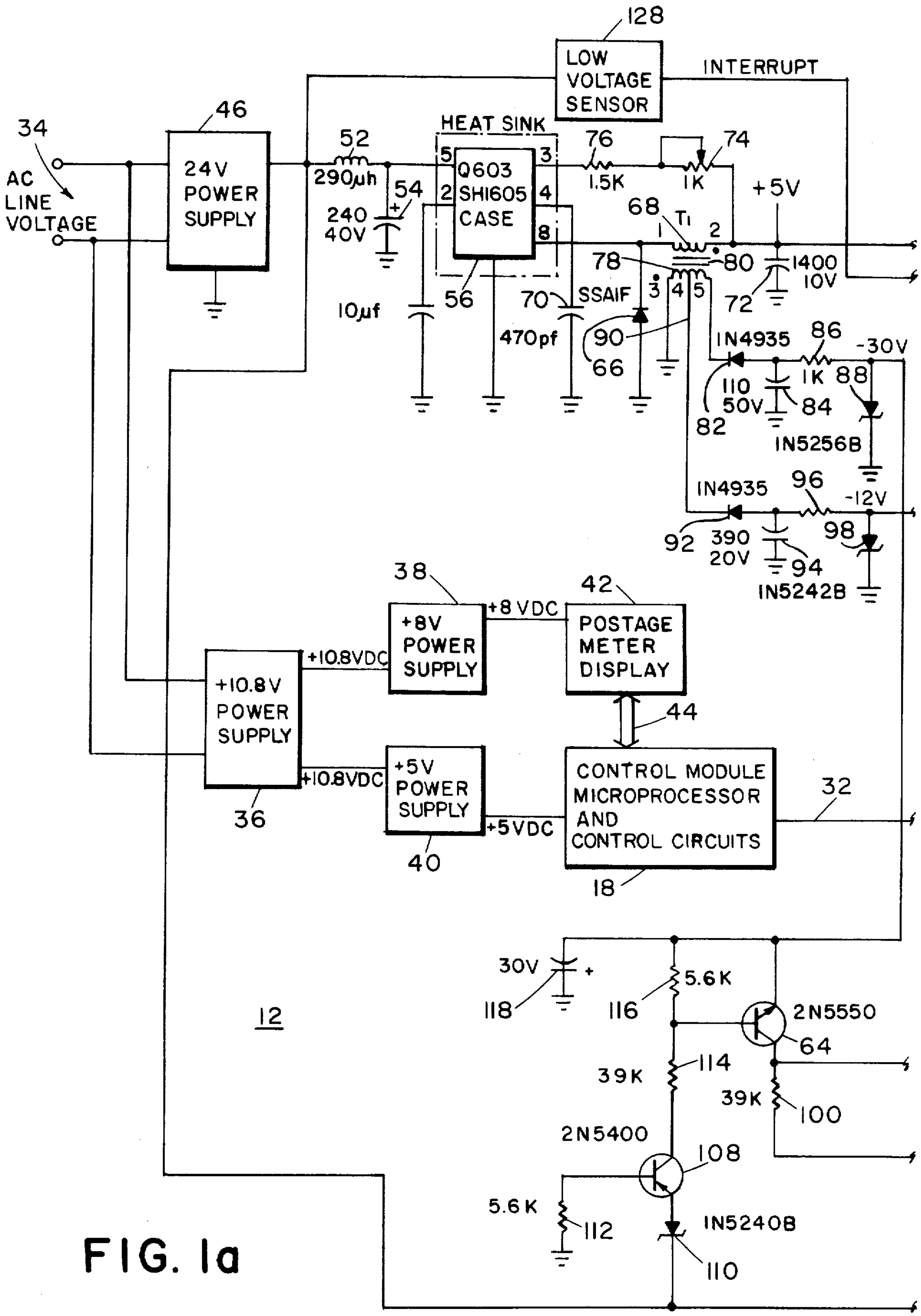

A complete understanding of the present invention may be obtained from the following detailed description thereof, when taken in conjunction with the accompanying drawings, in which:

FIG. 1 is an interconnection diagram of FIGS. 1*a* and 1*b*; and

FIGS. 1*a* and 1*b*, when taken together, are a schematic circuit diagram, partly in block form, of an electronic postage meter reset circuit embodying the present invention.

DETAILED DESCRIPTION

Reference is now being made to FIG. 1. A postage memter 12 includes an accounting module 14 having microprocessor and non-volatile memory such as a General Instrument Corporation ER3400 type electronically alterable read only memory. The General Instrument ER3400 is described in a General Instrument Corporation manual dated November 1977, entitled EAROM and designated by a number 12-11775-1; a printing module 16 having microprocessor and motor control circuits; and a control module 18 having a microprocessor and control circuits. The detail of construction and operation of the system may be in accordance with the postage meter system and the mechanical apparatus shown in the above-noted U.S. Pat. No. 4,301,507 for ELECTRONIC POSTAGE METER HAVING PLURAL COMPUTING SYSTEMS and in U.S. Pat. No. 4,287,825 for PRINTING CONTROL SYSTEM.

Postage meter 12 includes a series of opto-interrupters 20, 22, 24, 26 and 28. The opto-interrupters are used to sense the mechanical position of the parts of the meter. For example, the opto-interrupters can be employed to sense the position of the shutter bar which is used to inhibit operation of the meter under certain circumstances, the position of the digit wheels, the home position of the print drum, the position of the bank selector for the print wheels, the position of the interposer, or any other movable mechanical component within the meter. These opto-interrupters are coupled to the printing module 16 which monitors and controls the position of the mechanical components of the meter.

The printing module 16 is connected to the accounting module 14 via a serial data bus 30 and communicates by means of an ecoplex technique described in the above-noted U.S. Pat. No. 4,301,507 for ELECTRONIC POSTAGE METER HAVING PLURAL COMMPUTING SYSTEMS. Both ends of the bus are buffered by an optics buffer, not shown, which is energized by the power supply +5 volt line to be hereafter described. Similarly, the control module 18 is connected to the accounting module 14 via a serial data bus 32 and also communicates by means of the ecoplex technique. Optics buffers, not shown, are provided to buffer the bus. It should be recognized that the particular architecture of the postage meter system is not critical to the present invention. Plural or single microprocessor arrangements may be each be employed with the present invention.

A source of operating voltage, such as 110 volts 60 Hertz supply, is applied across meter input terminals 34. The voltage is applied to a linear +10.8 volt power supply 36. The output from the +10.8 volt linear power supply 36 is supplied to a first +8 volt linear regulated power supply 38 and to a second +5 volt linear regulated power supply 40. The +8 volt power supply is used to power a display 42 which is operatively coupled via a bus 44 to the control module 18. The output from the power supply 40 is directly coupled to the control module 18 and is operated to energize the control module microprocessor.

The AC operating voltage at terminals 34 is also applied to a silicon controlled rectifier type, 24 volt power supply 46. The regulated output from the power supply 46 is applied to the print wheel bank stepper motor 48 and the print wheel stepper motor 50 associated with the printing module 16. The 24 volt DC power supply is coupled by an AC choke 52 to capacitor 54. The internal capacitance within the 24 volt power supply 46 provides sufficient energy storage to continue to properly energizing a switching regulator 56 should an AC power failure occur at terminals 34. In such an event, the accounting module microprocessor 58 transfers information from the postage meter volatile memory (which may be internal or external to the microprocessor) via a data bus 60 to a NMOS non-volatile memory 62. The switching regulator 56, in conjunction with a transformer 68 with related circuitry, provides regulated output voltages used to energize the accounting module.

A +5 volts is developed and applied to the accounting module microprocessor 58, to NMOS non-volatile memory 62, to the optic buffers (not shown) for the serial data bus 30 connected between the accounting and the printing modules, to the printing module 16, and to the opto-interrupters 20–28. A −30 volts is also developed and is similarly applied via a NPN transistor 64 to the NMOS non-volatile 62. The −30 volts is required in conjunction with a −12 volts which is also developed and applied to the NMOS non-volatile memory 62 and the +5 volts to enable the non-volatile memory to have data written into the device.

The switching regulator 56 functions to selectively apply the 24 volts developed across a capacitor 54 to the junction of a diode 66 and poled transformer primary winding 68. The frequency at which the regulator 56 operates or switches is determined by a capacitor 70 which controls the operating frequency of the supply. Primary winding 68 is further coupled to ground by a capacitor 72. Diode 66 and capacitor 72 form a complete circuit in parallel with the primary winding 68. The circuit path is through a point of fixed referenced potential, here shown as ground.

During quiescent operation, a +5 volts is developed across capacitor 72. This voltage is sensed and coupled via a series connected variable resistor 74 and a fixed resistor 76 to an input terminal on the switching regulator 56. The feedback path controls the supply to maintain a constant voltage across capacitor 72. For the component value shown, a voltage variation of approximately 10 millivolts can occur across a capacitor 72. A step-up secondary winding 78 oppositely poled to the primary winding is electromagnetically coupled via a permalloy core 80 to the primary winding 68. The secondary winding 78 is connected to ground at one end and has its opposite end coupled via a diode 82 which operates in conjunction with a capacitor 84 and a current limiting resistor 86 to develop a −30 volts across a zener diode 88. A tap 90 on the secondary winding is connected to a diode 92 which operates in conjunction with a capacitor 94 and a current limiting resistor 96 to develop a −12 volts across a zener diode 98.

Because of the filtering provided by capacitor 72 and the inductance of the primary winding 68, the noise introduced by switching transients in the primary circuit is minimized. In a like manner, the capacitor is 84 and 94 and the inductance of the secondary winding 78, provide further filtering which also minimizes the noise introduced by swtitching transients. The operation of the power supply is described in greater detail in U.S. patent application Ser. No. 306,805 filed Sept. 29, 1981, for POWER SUPPLY SYSTEM and assigned to Pitney Bowes Inc.

A circuit is provided to insure that the NMOS non-volatile memory 62 is not energized by the −30 volts necessary for a writing operating after a predetermined voltage condition in the power down sequence has been reached. This circuit operates in conjunction with a second circuit adapted to insure a proper reset is applied in a predetermined relationship to the application and the removal of the −30 volts from the non-volatile memory. The system insures that even if data is put onto the data bus 60 by the microprocessor 58, no data will be written into the NMOS non-volatile memory 62. This is particularly important because it has been noted in the aforementioned U.S. patent application Ser. No. 306,979 for MEMORY PROTECTION CIRCUIT FOR AN ELECTRONIC POSTAGE METER that although the microprocessor may be designed to turn off and not output data at a determined voltage level, it has been discovered that such microprocessors may become active again even at lower voltages notwithstanding the signal applied to the microprocessor reset terminal.

The −30 volts supply to non-volatile 62 is passed through the collector-emitter current path of the NPN transistor 64. The collector electrode of the transistor is coupled via the resistor 100 to the +5 volts developed at capacitor 72. The voltage developed at the collector electrode of transistor 100 controls the voltage applied to the based electrode of a transistor 102 whose collector electrode is connected to the reset terminal 104 of the microprocessor 58 of the accounting module 14 and to the reset terminal 106 of the microprocessor for the printing module 16. Base bias for the transistor 64 is obtained from a PNP transistor 108. The emitter electrode of the transistor 108 is connected by a 10 volt zener diode 110 to the 24 volt power supply 46. A resistor 112 provides a ground return for the base electrode of transistor 108. Resistors 114 and 116 are connected to the base electrode of transistor 64. A capacitor 118 is provided to further filter transients.

The base electrode of transistor 102 is coupled to the collector electrode of transistor 64 by a resistor 120 and to the +5 volts developed at capacitor 72 by a resistor 122. A capacitor 124 is connected across the collector-emitter electrode current path of transistor 102. The collector electrode is further connected by a resistor 126 to the +5 volts developed at capacitor 72. It should be noted that although the transistor 102 is shown connected to the reset terminals 106 and 104 of the microprocessors, respectively, associated with the printing module 16 and the accounting module 14, the arrangement is only by way of example. The reset system can be employed with either single microprocessor or plural microprocessor electronic postage meter systems.

When the AC line voltage at terminals 34 fails, and the 24 volts power supply 46 output voltage begins to drop and fall below a predetermined level, such as 19 volts, a low voltage detector 128 with about 2 volts of hysterisis senses the falling voltage and initiates an interrupt signal to an interrupt or restart terminal 130 on the accounting module microprocessor 58. The routine may be initiated by a system such as that disclosed in the aforementioned U.S. Pat. No. 4,285,050 for ELECTRONIC POSTAGE METER OPERATING VOLTAGE VARIATION SENSING SYSTEM. The interrupt routine completes all pending accounting functions and transfers all register readings from the internal microprocessor RAM to the external non-volatile memory 62. It then goes into a wait loop which is terminated by a microprocessor reset or the return of normal voltage, indicated by a voltage greater than 21 volts at low voltage sensor 128. When the AC line voltage line drops to a level such that the 10 volts zener diode 110 is no longer operating in a breakdown mode, current flow through the collector-emitter of transistor 108 ceases. As a result, transistor 64 is biased out of conduction. This causes the +5 volts which is applied via resistor 100 to the collector electrode of transistor 64 to be applied to the NMOS non-volatile memory −30 volt terminal 132. It should be noted that the −30 volts is required in conjunction with a −12 volts (which is also developed and applied to the NMOS non-volatile memory 62 −12 volts terminal 134) to have data written into the memory. Thus, rather than a negative voltage being applied to the microprocessor NMOS non-volatile memory −30 volt terminal 132, a positive voltage is applied and information cannot be written into the memory.

Simultaneous with the application of the +5 volts to the NMOS non-volatile memory −30 volt terminal 132, the +5 volts is likewise applied via resistors 100, 120 and 122 to the base electrode of transistor 102. This biases transistor 102 into conduction causing capacitor 124 to quickly discharge through the collector-emitter electrode current path of transistor 102 thereby applying a reset signal to the reset terminals 104 and 106 of the accounting module microprocessor 58 and the printing module microprocessor by coupling these terminals to ground. The activation of the reset terminal places the microprocessor in a known condition. Nevertheless, the +5 volts applied to the NMOS non-volatile memory terminal 132 insures that no information can be written into the non-volatile memory 62 during the remainder of the power down cycle. This is because, as peviously noted, a −30 volts must be applied to terminal 132 to enable a WRITE operation in the NMOS non-volatile memory 62. The microprocessors reset terminal will have a reset signal applied (a ground level potential) as power decays until the voltage at the base electrodes of transistor 102 falls below the level necessary to forward bias the base-emitter junction, usually approximately 7/10ths of a volt for many devices.

For the various supplies and component value shown, by the time the output voltage of the +24 supply 46 decays to approximately +7.5 volts, the +5 volts developed at capacitor 72 will begin to drop. By this time however, the 10 volt zener diode 110 will have been turned off for a voltage change of approximately 2½ volts and terminal 132 will have had a positive voltage applied to it. Thus, when the output voltage from the +24 volts supply drops to approximately +10 volts, a positive potential is applied to the NMOS non-volatile memory −30 volts write enable terminal 132, and no data can be written by microprocessor 58 into the non-volatile memory 62. This situation continues until the voltage falls below the range of uncertain operating voltage levels wherein the microprocessor 58 may operate despite a reset signal being applied to the reset terminal 106. Protection against writing into the NMOS non-volatile memory 62 is afforded by control over the conductivity of the collector-emitter electrode current path of transistor 64.

During a power-up routine as the voltages begin to build, the voltage from the +24 volts power supply 46 begins to charge up its capacitors including capacitor 54 as it builds toward the 24 volt output. When the voltage builds to a sufficient level, zener diode 110 will breakdown and begin to conduct. This establishes a current flow through the collector-emitter electrode current path or transistor 108 which in turn biases transistor 64 into conduction. As a result, the −30 volts is coupled via resistor 120 to the base electrode of transistor 122 biasing the transistor out of conduction. Up to this point in time, howver, transistor 102 is biased into conduction as the voltage builds by the +5 volts applied to its base electrodes via resistors 100, 120 and 122. This prevents a charge from building up on capacitor 124 thereby causing a solid reset signal to be applied to the reset terminals 104 and 106. When the −30 volts is applied to the NMOS non-volatile memory terminal 132, transistor 102 is biased out of conduction. This allows capacitor 124 to begin charging from the +5 volts supply through resistor 126. When the capacitor is charged to a suitable level, the reset signal is removed from the reset terminals 104 and 106 of the microprocessors, and the microprocessors begin executing instructions. It should be noted that the time delay due to charging the capacitor 124 and controlling the bias of transistor 102 from the −30 volts supply insures that the −30 volts potential is applied and has stablized on the NMOS non-volatile memory −30 volt terminal 132 prior to the microprocessor reset terminals being released to enable the microprocessor to commence operation. Moreover, when the power begins to fall, the reset terminals 104 and 106 of the microprocessors are rendered active putting the microprocessors in the reset condition simultaneous with the removal of the −30 volts supply from the NMOS non-volatile memory terminal 132.

The sequence of operation of the electronic postage meter reset circuit shown in FIGS. 1*a* and 1*b* is set forth in the following table of Sequence of Operations.

Sequence of Operations

| State | 24 V Supply | +5 V Supply | Microprocessor Reset | Low Voltage Sense | Non-Volatile Memory (NVM) |
|---|---|---|---|---|---|
| | | | Power-Up | | |
| 1 | 0-7.5 | <5 | Indeterminate | Low | Disabled |
| 2 | 7.5-10 V | +5 | Reset | Low | Disabled |
| 3 | 10-21 V | +5 | Wait* Loop | Low | Enabled |
| 4 | 21-24 V | +5 | Read NVM Then Operate | Normal | Enabled |
| | | | Power-Down | | |
| 4 | 24-19 V | +5 | Operate | Normal | Enabled |
| 5 | 19-10 V | +5 | Write NVM Then Wait** Loop | Low | Enabled |
| 2 | 10-7.5 | +5 | Reset | Low | Disabled |
| 1 | 7.5-0 | <5 | Indeterminate | Low | Disabled |

*Can go to either state 2, 4 or 5 if line voltage fluctuates widely.
**Can go to either state 2 or 3 if line voltage fluctuates widely.

It is known and understood for the purpose of the present application that the term postage meter refers to the general class of device for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusive employed by governmental postage and tax services. For example, private, parcel and freight services purchase and employ such meters as a means to provide unit value printing and accounting for individual parcels.

Having described the invention in conjunction with the specific embodiment thereof, it is to be understood that further modification may suggest itself to those skilled in the art. The scope of the present invention is not to be limited to the embodiment disclosed but to be interpreted as set forth in the appended claim.

What is claimed is:

1. In an electronic postage meter energized by a source of operating voltage and having printing means for printing postage and accounting means coupled to said printing means for accounting for postage printed by said printing means, the improvement comprising:

said accounting means coupled to said source of operating voltages and including computer means having a reset terminal energized by a first predetermined reset terminal voltage to enable said computer means to be conditioned to output data and said reset terminal further energized by a second predetermined reset terminal voltage to disable said computer means from being conditioned to output data;

non-volatile memory means operatively coupled to said computer means for storing accounting data when said source of operating voltage is not operating to energize said accounting means, said non-volatile memory having a terminal which when energized by a voltage of a first predetermined polarity enables said non-volatile memory to have data written into memory locations by said computer means;

first means for generating a voltage of said first predetermined polarity;

second means for generating a second voltage differing from said voltage of said first predetermined polarity;

third means coupled to said first voltage generating means, said second voltage generating means and said non-volatile memory terminal for applying said voltage of said first predetermined polarity to said non-volatile memory terminal when said source of operating voltage is above a predetermined level and for applying said second voltage to said memory write enable terminal when said source of operating voltage is below a predetermined level; and fourth means coupled to said third means and to said computer reset terminal for energizing said computer means reset terminal with said first predetermined reset terminal voltage after said non-volatile memory terminal is energized by said voltage of a first predetermined polarity such that said computer means is conditioned to output data after said non-volatile memory terminal has been energized to enable data to be written into memory locations by said computer means.

2. An electronic postage meter as defined in claim 1 wherein said fourth means is further adapted to selectively energize said computer means reset terminal with said second predetermined reset terminal voltage.

3. An electronic postage meter as defined in claim 1 wherein said fourth means is adapted to energize said computer means reset terminal with said second predetermined reset terminal voltage when said third means applies said second voltage to said non-volatile memory terminal such that said computer means is disabled from operating to output data when said non-volatile memory terminal has been energized to disable data from being written into memory locations by said computer means.

4. In an electronic postage meter of the type energized by a source of operating voltage and including a printing means for printing postage, accounting means coupled to and energized by said source of operating voltage and further coupled to said printing means for accounting for postage printed by said printing means, the improvement comprising:

non-volatile memory means operatively coupled to said accounting means for storing accounting data when said external source of operating voltage is not operating to energize said accounting means, said non-volatile memory having a terminal which when energized by voltage of a first predetermined polarity enables said non-volatile memory to have data written into memory locations by said accounting means;

said accounting means including computing means having a reset terminal which when energized by a first voltage enables said computing means to output data to said non-volatile memory means and which when energized by a second voltage disables said computer means from being operable to output data to said non-volatile memory means;

first means for generating a voltage of said first predetermined polarity;

second means for generating a predetermined voltage;

a first and a second three terminal switching device each having a first, a second and a control terminal;

said first-second terminal current path of said first device connected in series between said non-volatile memory terminal and said first voltage generating means;

means for sensing the voltage level of said source of operating potential;

means coupling the control terminal of said first device to said sensing means such that said sensing means controls the conductivity of said first-second terminal of said first device; and said first-second terminal current path of said second three terminal device coupled between said second voltage generating means and a point of fixed reference potential, said first terminal of said second three terminal device coupled to said computer means reset terminal, and said control terminal of said second three terminal device coupled to said first terminal of said first three terminal device.

5. An electronic postage meter as defined in claim 4 wherein said first and said second three terminal devices are transistors.

6. An electronic postage meter, comprising:

printing means for printing postage;

accounting means coupled to said printing means for accounting for postage printed by said printing means, said accounting means including a microprocessor having a reset terminal and data terminals;

non-volatile memory means including a memory terminal;

data bus means coupling said microprocessor data terminals and said non-volatile memory to enable said microprocessor to read data from said non-volatile memory and to write data into said non-volatile memory;

means for generating a first operating potential of a first polarity;

means for generating a second operating potential of a polarity opposite to the polarity of said first operating potential;

a first transistor having an emitter electrode, a collector electrode and a base electrode, said collector-emitter electrode current path coupled between said non-volatile memory terminal and said means for generating said first operating potential;

resistor means coupling said collector electrode of said first transistor to said means for generating said second operating potential;

a second transistor having a collector, an emitter and a base electrode, said collector-emitter electrode current path of said second transistor coupled between said means for generating said second operating potential and a point of fixed reference potential;

means coupling the collector electrode of said second transistor to said microprocessor reset terminal;

capacitor means coupled between the collector and emitter electrodes of said second transistor; and voltage divider means coupled to the base electrode of said second transistor and between the collector electrode of said first transistor and said means for generating said second source of operating potential.

7. An electronic postage meter as defined in claim 6 wherein said printing means includes a microprocessor for controlling the operation of said printing means, said printing means microprocessor having a reset terminal, and means coupling said reset terminal of said printing module microprocessor to the collector electrode of said second transistor.

8. An electronic postage meter as defined in claim 6 further comprising:

a third transistor having an emitter, a collector and a base electrode;

a zener diode;

a power supply coupled to and adapted to energize said first and second means for generating said operating; and the collector-emitter electrode current path of said third transistor connected in series with said zener diode between said power supply and the base electrode of said first transistor.

9. An electronic postage meter as defined in claim 8 wherein said accounting means microprocessor includes an interrupt terminal and further including a voltage sensor coupled between said power supply and said accounting means microprocessor interrupt terminal.

* * * * *